United States Patent [19]

Manners et al.

[11] Patent Number: 5,241,017
[45] Date of Patent: Aug. 31, 1993

[54] THIONYL PHOSPHAZENE POLYMERS

[75] Inventors: Ian Manners, Ontario; Mong Liang, Toronto; Andreas Ostrowicki, Ontario, all of Canada

[73] Assignee: Bayer Aktiengesellschaft, Leverkusen, Fed. Rep. of Germany

[21] Appl. No.: 848,940

[22] Filed: Mar. 10, 1992

[30] Foreign Application Priority Data

Mar. 20, 1991 [DE] Fed. Rep. of Germany ....... 4109074

[51] Int. Cl.$^5$ ............................................. C08G 73/00
[52] U.S. Cl. ................................... 525/417; 528/377
[58] Field of Search ....................... 525/417; 528/377

[56] References Cited
U.S. PATENT DOCUMENTS 4,440,921  4/1984  Allcock et al. ................... 525/417

OTHER PUBLICATIONS

Journal of the American Chemical Society, Bd. 113, Nr. 10, (1991), pp. 4044–4045, M. Liang and I. Manners, "Poly(thionylphosphazenes): A New Class of Inorganic Polymers with Skeletal Phosphorus, Nitrogen, and Sulfur (6) Atoms".
Journal of the American Chemical Society, Bd. 112, Nr. 3, (1990), pp. 1268–1269, J. A. Dodge et al., "Poly(thiophosphazenes): New Inorganic Macromolecules with Backbones Composed of Phosphorus, Nitrogen, and Sulfur Atoms".
Makromol. Chem. Rapid Commun., Bd. 12, Nr. 11, (1991), pp. 613–616, M. Liang and I. Manners, "Poly(thionylphosphazenes) with fluorine substituents at sulfur: A new class of inorganic fluoropolymers".
Polym. Prepr. (Am. Chem. Soc., Div. Polym. Chem.), Bd. 32, Nr. 3, (1991), pp. 487–488, M. Liang et al., "Poly(thionylphosphazenes): A New Class of Inorganic Polymers with Skeletal Phosphorus, Nitrogen, and Sulfur (6) Atoms".

*Primary Examiner*—Maurice J. Welsh
*Attorney, Agent, or Firm*—Connolly & Hutz

[57] ABSTRACT

The new thionyl phosphazene polymers, which contain recurring structural units corresponding to the following formula

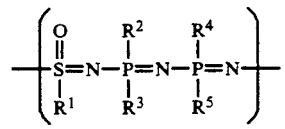

are prepared by ring-opening polymerization of cyclothionyl chlorophosphazene corresponding to the following formula

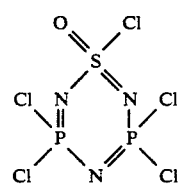

at temperatures of 100° to 300° C. in the presence of an inert organic solvent and reaction of the polymer thus obtained, which corresponds to the following formula

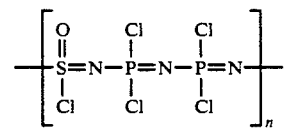

with salts corresponding to the following formula

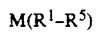

in the presence of an inert organic solvent at temperatures of 20° to 200° C.

The new thionyl phosphazene polymers may be used for the production of thermoplastics, elastomers or thermosets.

10 Claims, No Drawings

THIONYL PHOSPHAZENE POLYMERS

This invention relates to new thionyl phosphazene polymers, to a process for their production and to the use of thionyl phosphazene polymers for the manufacture of thermoplastics, elastomers or thermosets by crosslinking.

Phosphazene polymers containing various substituents and thermoplastics, elastomers and thermosets produced therefrom are known (see for example H.R. Allcock, Macromol. Chem., Macromol. Symp. 6 (1986), 101–108).

Polyphosphazenes can be processed to various mouldings which are distinguished inter alia by flexibility at low temperatures, resistance to oils and flame resistance. However, the disadvantage of polyphosphazene elastomers is their inadequate resistance to hydrolysis.

The present invention relates to new linear or branched, soluble thionyl phosphazene polymers having an average molecular weight $M_n$ of 10,000 to 3,500,000 (g/mol) and bearing recurring structural units corresponding to the following formula

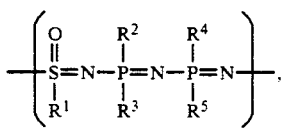

in which
R$^1$ is halogen, pseudohalogen, optionally substituted $C_{1-18}$ alkoxy, $C_{5-8}$ cycloalkoxy, $C_{6-14}$ aryloxy, $C_{7-18}$ alkaryloxy, $C_{2-18}$ alkenoxy, $C_{8-18}$ alkenylaryloxy or a siloxane group, R$^2$ to R$^5$ may be the same or different and represent optionally substituted $C_{1-18}$ alkoxy, $C_{5-8}$ cycloalkoxy, $C_{6-14}$ aryloxy, $C_{7-18}$ alkaryloxy, $C_{2-18}$ alkenoxy, $C_{8-18}$ alkenylaryloxy or a siloxane group, the proportion of unsaturated substituents R$^1$ to R$^5$ being up to 10%, based on the total number of substituents R$^1$ to R$^5$.

The halogens in the above formula (I) may be fluorine, chlorine or bromine, preferably fluorine or chlorine; the pseudohalogens may be the cyano or the thiocyano group; the alkoxy radicals may be methoxy, ethoxy, propoxy, isopropoxy, butoxy, isobutoxy, sec. butoxy, pentyloxy, hexyloxy or octyloxy radicals: the cycloalkoxy radicals may be cyclopentoxy, cyclohexyloxy, methyl cyclopentyloxy, methyl cyclohexyloxy or decahydronaphthoxy radicals; the aryloxy radicals may be phenoxy, 1- or 2-naphthoxy, anthraceneoxy or phenanthreneoxy radicals; the alkaryloxy radicals may be o-, m- or p-methylphenoxy, 2,3-, 2,4-, 2,5-, 2,6-, 3,4- or 3,5-dimethylphenoxy, o-, m- or p-ethylphenoxy radicals; the alkenoxy radicals may be allyloxy, 2- or 3-butenoxy, pentenyloxy, 3-methyl-3-buten-1-oxy, hexenyloxy, octenyloxy, 9-octadecenyloxy, cyclohexenyloxy or octahydronaphthoxy radicals; the alkenylaryloxy radicals may be the o-, m- or p-vinylphenoxy and o-, m- or p-allylphenoxy radicals.

The siloxane groups in the above formula (I) is of those corresponding to the following formula

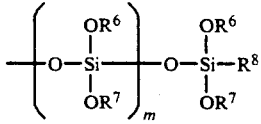

in which
R$^6$ and R$^7$ may be the same or different and represent $C_{1-8}$ alkyl, $C_{2-8}$ alkenyl or $C_{6-14}$ aryl groups, R$^8$ represents $OC_{1-8}$ alkyl, $OC_{6-14}$ aryl, the amino group or the O-acryl group and m is 0 or an integer from 1 to 10 limits included.

The substituents R$^1$ to R$^5$ in formula (I) may be substituted by halogen, such as fluorine or chlorine, or by $C_{1-4}$ alkyl radicals, $C_{6-10}$ aryl or substituted aryl radicals, by ester, nitro, amino, cyano or sulfo groups, ether or polyether groups corresponding to formula R$^9$—(O—R$^{10}$)$_n$—O—, in which R$^9$ is a $C_{1-5}$ alkyl, $C_{6-10}$ aryl, $C_{5-8}$ cycloalkyl, $C_{7-18}$ alkaryl, $C_{7-18}$ aralkyl group, R$^{10}$ is a difunctional aliphatic $C_{1-4}$ hydrocarbon group and n is an integer from 1 to 70 (further examples can be found in U.S. Pat. No. 4,258,173). The radicals in question may be substituted one or more times; where they are substituted by halogen, they are preferably multiply substituted.

Preferred radicals R$^1$ to R$^5$ are methoxy, ethoxy, propoxy, isopropoxy, butoxy, pentyloxy, hexyloxy, octyloxy, 2-phenylethoxy, cyclohexyloxy, decahydronaphthoxy, 2-chloroethoxy, 2,2-dichloroethoxy, 2,2,2-trichloroethoxy, 2,2,2-trifluoroethoxy, 3,3,3-trifluoropropoxy, 2,2,3,3-tetrafluoropropoxy, pentafluoropropoxy, heptafluorobutoxy, pentadecafluorooctyloxy, 2-methoxyethyloxy, 2-ethoxyethyloxy, 2-propoxyethyloxy, 2-butoxyethyloxy, 2-phenoxyethyloxy, 2-(methylphenoxy)-ethyloxy, 2-(2-methoxyethoxy)-ethyloxy, 2-(2-ethoxyethoxy)-ethyloxy, 2-(2-butoxyethoxy)-ethyloxy, phenoxy, p-, m- or o-methylphenoxy, o-, m- or p-ethylphenoxy, 2,3-, 2,4-, 2,5-, 2,6- or 3,4-dimethylphenoxy, p- or m-fluorophenoxy, 2,3-, 2,4-, 2,5-, 2,6- or 3,4-difluorophenoxy, p- or m-chlorophenoxy, 2,3-, 2,4-, 2,5-, 2,6- or 3,4-dichlorophenoxy, p- or m-bromophenoxy, 2,3-, 2,4-, 2,5- or 3,4-dibromophenoxy, p- or m-trifluoromethylphenoxy, p- or m-nitrophenoxy, p- or m-cyanophenoxy, o-, m- or p-methoxyphenoxy, 1- or 2-naphthoxy, allyloxy, 2 -or 3-butenoxy, 3-methyl-3-buten-1-oxy, pentenyloxy, hexenyloxy, octenyloxy, 9-octadecenyloxy, cyclohexenyloxy, octahydronaphthoxy, 2-chloro-2-propenoxy,3-chloro-2-propenoxy, 2-chloro-2-butenoxy, 4-chloro-2-butenoxy, 2-chloro-3-butenoxy, 4-chloro-3-butenoxy, o-, m- or p-vinylphenoxy and o-, m- or p-allylphenoxy; more preferably methoxy, ethoxy, butoxy, hexyloxy, 2,2,2-trichloroethoxy, 2,2,2-trifluoroethoxy, 3,3,3-trifluoropropoxy,2,2,3,3-tetrafluoropropoxy, pentafluoropropoxy, heptafluorobutoxy, 2-methoxyethyloxy, 2-ethoxyethyloxy, 2-(2-methoxyethoxy)-ethyloxy, 2-(2-ethoxyethoxy)-ethyloxy, phenoxy, p- or m-methylphenoxy, p- or m-fluorophenoxy, 2,3-, 2,4-, 2,5-, 2,6- or 3,4-difluorophenoxy, p- or m-chlorophenoxy, 2,3-, 2,4-, 2,5-, 2,6- or 3,4-dichlorophenoxy, p- or m-bromophenoxy, 2,3-, 2,4-, 2,5- , 2,6- or 3,4-dibromophenoxy, p- or m-trifluoromethylphenoxy, allyloxy, 3-methyl-3-buten-1-oxy, 9-octadecenyloxy, 2-chloro-2-propenoxy, 3-chloro-2-propenoxy, 2-chloro-2-butenoxy, 4-chloro-2-butenoxy, 2-chloro-3-butenoxy and 4-chloro-3-butenoxy and also o-allylphenoxy.

Preferred siloxane groups are those in which $R^6$ and $R^7$ are methyl or phenyl, $R^8$ is methyl or phenyl and $m = 1$ to 10.

It is pointed out in this connection that, where the substituents $R^1$ to $R^5$ are the same, the thionyl phosphazenes are homopolymers and, where the substituents $R^1$ to $R^5$ are different, they are copolymers.

The physical properties of the thionyl phosphazene polymers according to the invention can be modified within wide limits by variation of the substituents $R^1$ to $R^5$. The thionyl phosphazene polymers according to the invention thus have glass transition temperatures in the range from $-100°$ C. to $+250°$ C. and preferably in the range from $-60°$ C. to $+200°$ C.

The average molecular weights $M_n$ of the thionyl phosphazene polymers according to the invention are in the range from 10,000 to 3,500,000, preferably in the range from 15,000 to 2,500,000 and, more preferably, in the range from 20,000 to 1,000,000 g/mol.

The thionyl phosphazene polymers may be cross-linked in the usual way by suitable crosslinking agents or by irradiation to form elastomers. Crosslinking may be carried out with sulfur or sulfur donors, such as dithiocarbamates, for example copper-N,N-dimethyl, zinc-N,N-dimethyl, tellurium-N,N-diethyl, cadmium-N,N-dicyclohexyl, lead-N,N-dimethyl, selenium-N,N-dibutyl, zinc-N-pentamethylene, zinc-N,N-diethyl and zinc-N-isopropyl-N-octyl dithiocarbamate, or thioureas, for example zinc ethyl xanthogenate, sodium isopropyl xanthogenate, dixanthogene dibutyl ester, potassium isopropyl xanthogenate, zinc butyl xanthogenate, or thiazoles, for example 2-mercaptobenzthiazole, the zinc salt of 2-mercaptobenzthiazole, 2-benzothiazolyl-N,N-diethyl thiocarbamyl sulfide, dibenzothiazyl disulfide or imidazoles, for example 2-mercaptoimidazoline, 2-mercapto-4,4,6-trimethyl dihydropyrimidine, or sulfenamides, such as N-tert.-butyl-2-benzothiazolyl, N-cyclohexyl benzothiazolyl, N,N-diisopropylbenzothiazolyl, N-(2,6-dimethylmorpholino)-2-benzothiazolyl, N,N-diethyl benzothiazolyl sulfenamide, or thiuram disulfides, such as N,N'-diethyl, tetrabutyl, N,N'-dicyclohexyl and tetramethyl thiuram disulfide, or by peroxides, such as aromatic or aliphatic diacyl peroxides, dicarboxylic acid diperoxides, ketone peroxides, alkyl peroxyesters, alkyl hydroperoxides. Examples include diacetyl, dibenzoyl, di-(2,4-dichlorobenzoyl), di-tert. butyl, dicumyl peroxide, tert. butyl perbenzoate, tert. butyl cumyl peroxide, 2,5-bis-(tert.-butylperoxy)-2,5-dimethyl hexane, 2,5-bis-(tert.-butyl-peroxy)-2,5-dimethyl-3-hexine, 4,4,4',4'-tetra-(tert.-butylperoxy)-2,2-dicyclohexyl propane, 1,4-bis-(tert.-butylperoxyisopropyl)-benzene, 1,1-bis-(tert.-butyl-peroxy)-3,3,5-trimethyl cylohexane, lauroyl peroxide, cyclohexanone peroxide, tert. butyl peracetate, butyl hydroperoxide. Other radical donors, such as azides, are also suitable for crosslinking, tetramethylene-bis-(azideformate) being mentioned as an example (further examples can be found in U.S. Pat. No. 3,284,421).

Where crosslinking is carried out with radical-forming reagents, it is often advisable to use co-agents having multiple unsaturation, such as, for example, triallyl cyanurate, N,N'-m-phenylene dimaleic imide or trimethylol propane trimethacrylate. In the case of halogen-containing thionyl phosphazene polymers corresponding to formula (I), metal oxides, such as zinc oxide, magnesium oxide, lead oxide, are also suitable for crosslinking the polymers according to the invention.

The crosslinking reaction may also be carried out with phenolic curing systems.

The basic constituents of such curing systems are phenolic resins produced by condensation of substituted or unsubstituted phenols in an alkaline medium or by condensation of bifunctional phenol dialcohols.

Phenolic curing systems containing phenolic resin, metal compounds and optionally a halogen donor are particularly recommended (details of such systems can be found, for example, in U.S. Pat. No. 3,287,440 and in U.S. Pat. No. 3,709,840). Normally, halogenated, preferably brominated, phenolic resins containing 2 to 10% by weight bromine do not require a halogen donor, but are used together with a hydrogen halide acceptor, for example together with iron oxide, titanium oxide, magnesium oxide, magnesium silicate, silicon dioxide or preferably zinc oxide. The presence of these compounds promotes the crosslinking function of the phenolic resin.

The thionylphosphazene polymers according to the invention may also be crosslinked with halogen-free or halogen-containing resin systems and metal oxides or organic acids, such as for example stearic acid, in combination with metal oxides, preferably with halogen-free resin systems in the presence of a halogen donor and zinc oxide or with halogen-containing resins and zinc oxide.

The manufacture of halogenated phenolic resins and their use in curing systems containing zinc oxide is described in U.S. Pat. No. 2,972,600 and in U.S. Pat. No. 3,093,613. Reference is hereby made to these descriptions and to the two above-cited patents. Suitable halogen donors are, for example, tin(II) chloride, iron(III)-chloride or halogenated polymers, such as chlorinated paraffin, chlorinated polyethylene, sulfochlorinated paraffin and polychlorobutadiene. Further particulars of phenolic curing systems can be found in Hoffmann, Vulcanization and Vulcanizing Agents, New York, 1967.

The most effective crosslinking agents may readily be determined by preliminary tests and depend inter alia upon the substituents $R^1$ to $R^5$. As already mentioned, cross-linking (vulcanization) may be carried out in known manner with the usual crosslinking agents. Corresponding processes and agents are described, for example, in Vulcanization of Elastomers, I.J. Sjothum (Ed.), New York, 1964, pages 126 to 152 and 153 to 194; Vulcanization and Vulcanization Agents, W. Hoffmann, New York, 1967 and in Rubber Compounding, F.W. Barlow (Ed.), New York, 1988. As already mentioned, the thionyl phosphazene polymers may also be cross-linked by irradiation with electrons in doses of 1 to 15 megarad.

Biocompatible polymers or polymers decomposing in biological systems to form harmless or metabolizable molecules are obtained when $R^1$ to $R^5$ represent glyceryl derivatives, derivatives of sugars, such as glucosyl derivatives, derivatives of amino acid groups or peptide groups. Where $R^1$ to $R^5$ consist of amino acid or peptide groups, they may be attached to the polymer by the amino group or, in the case of hydroxyl-functional amino acid groups, such as serine or threonine groups, by the hydroxyl groups. Suitable derivatives of amino acid or peptide groups are, for example, esters, such as methyl or tert. butyl esters of alanine or leucine groups. Further examples can be found in Allcock, Angew. Chem., Int. Ed. Engl. 16 (1977), 147–156. Depending on the nature of the substituents $R^1$ to $R^5$, the polymers obtained in this way may be insoluble or soluble in water or may form hydrogels.

The polymers may be used, for example, in the medical field, for example as a wound-stitching material, gauze, membranes, or as carriers for bioactive agents which, providing the substituents $R^1$ to $R^5$ are suitably selected for this application, provide for controlled release of the active substances through the decomposition of the polymer according to the invention under physiological conditions.

The present invention also relates to a process for the production of thionyl phosphazene polymers corresponding to the above general formula, characterized in that a cyclothionyl chlorophosphazene corresponding to the following formula

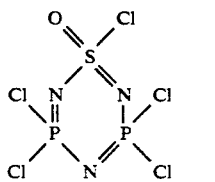 (II)

is subjected to ring-opening polymerization at temperatures of 100° to 300° C. in the presence of an inert organic solvent and the polymer obtained, which corresponds to the following formula

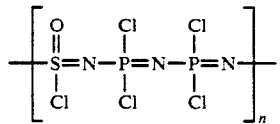 (III)

in which n is an integer of 30 to 10,600 and preferably 45 to 7,540, is reacted with salts corresponding to the following formula $M(R^1-R^5)$ (IV)

in which
M is preferably an alkali metal or alkaline earth metal ion or a tetraalkyl ammonium ion and
$R^1$ to $R^5$ represent optionally substituted $C_{1-18}$ alkoxy, $C_{5-8}$ cycloalkoxy, $C_{6-14}$ aryloxy, $C_{7-18}$ alkaryloxy, $C_{2-18}$ alkenoxy, $C_{8-18}$ alkenylaryloxy or a siloxane group,
in the presence of an inert organic solvent at temperatures of 20° C. to 200° C., preferably at temperatures of 20° C. to 150° C. and more preferably at temperatures of 20° C. to 100° C.

In the process according to the invention, the ring-opening polymerization may also be carried out in the absence of an inert organic solvent. To avoid unwanted secondary reactions during the ring-opening polymerization, it can be of advantage to carry out the polymerization reaction in an inert gas atmosphere, for example in the presence of nitrogen and/or helium, or under reduced pressure, for example at 0.01 to 0.1 bar.

The ring-opening polymerization of compound (II) is carried out at 100° to 300° C., preferably at 150° to 250° C. and, more preferably, at 155° to 175° C. The reaction time is in the range from about 1 hour to 100 hours and preferably in the range from 2 to 50 hours.

Suitable inert organic solvents are, in particular, chlorobenzene, dichlorobenzene and/or trichlorobenzene.

The inert solvents are normally used in excess, i.e. in a 5- to 20-fold excess by weight, based on compound (II).

The polymer of formula (III) obtained can be purified by dissolution in suitable solvents, such as benzene, dioxane and/or methylene chloride, and subsequent precipitation in another solvent, such as hexane.

The thionyl phosphazene polymers according to the invention are obtained by reaction of the polymers of formula (III) obtained with, preferably, alkali metal and/or alkaline earth metal salts and/or tetraalkyl ammonium salts corresponding to formula (IV), preferably at temperatures of 20° to 100° C. In this reaction, the sum total of the alkali metal and/or alkaline earth metal salts and/or tetraalkyl ammonium salts corresponding to formula (IV) is used in quantities of 1 to 10 mol and preferably 1 to 5 mol, based on each mol chlorine atoms to be reacted.

In the reaction of the polymer corresponding to formula (III) with the alkali metal and/or alkaline earth metal and/or tetraalkyl ammonium salts corresponding to formula (IV), it is possible by careful control of the reaction, for example by using a small excess of the salts of formula (IV) or by applying a low reaction temperature, to obtain the corresponding thionyl halophosphazene polymers because, surprisingly, only the chlorine atoms at the phosphorus are initially exchanged for the radicals $R^2$ to $R^5$.

As mentioned above, the thionyl phosphazene polymers according to the invention may be used for the manufacture of thermoplastics, thermosets or elastomers by cross-linking. The thionyl phosphazene polymers can be cross-linked under particularly mild conditions if the substituents $R^1$ to $R^5$ in the polymer consist partly of unsaturated substituents. The thionyl phosphazene polymers according to the invention are preferably used for the production of elastomers.

The known auxiliaries and additives, such as carbon black, inorganic fillers, such as chalk, barium sulfate, aluminium hydroxide, magnesium hydroxide, silicas and/or clays and also pigments, plasticizers, antioxidants and oils may be added in the usual quantities to obtain a cross-linked thionyl phosphazene polymer with the appropriate properties (cf. Rubber Compounding, F.W. Barlow, New York, 1988).

The thionyl phosphazene polymers according to the invention are distinguished in particular by excellent physical properties. They are resistant to a broad range of temperatures, particularly high temperatures, and—providing the substituents $R^1$ to $R^5$ are suitably selected—show outstanding chemical resistance to organic solvents, acids and bases.

EXAMPLE 1

Preparation of Cyclothionyl Chlorophosphazene (On the Basis of the Method Described in Z. Naturforschung, Vol. 27b, Page 467 (1972) and Synthesis 369 (1983)

15 g sulfuryl amide $SO_2(NH_2)_2$ were added at 25° C. to a stirred solution of phosphorus pentachloride (65 g) in 300 ml toluene. The mixture was heated for 6 hours at 70° C. until the all the sulfuryl amide had dissolved. Hexamethyl disilazane (36.1 g) was added dropwise with stirring to the resulting solution over a period of 5 hours at 70° C. The suspension obtained was stirred for 2 hours and the volatile compounds were removed in vacuo. A white, solid mass was obtained. 600 ml chloroform containing 7.6 g ethanol were added to this mass at 0° C., after which the mixture was stirred for another 2 hours. On completion of the reaction, the mixture was poured onto ice (700 g) and left standing overnight. The organic layer was removed, dried over anhydrous magnesium sulfate and the solvent removed in vacuo. The oily residue obtained was light yellow in color. The oily residue was extracted with 250 ml hexane. After the solvent had been removed under reduced pressure, a white mass was left behind. A white, crystalline solid suitable for polymerization was obtained by purification by vacuum sublimation (approx. $10^{-3}$ torr).

EXAMPLE 2

Procedure for the Preparation of Polythionyl Chlorophosphazene

Cyclothionyl chlorophosphazene was heated for 7 hours to 165° C. under reduced pressure in a closed reaction vessel. The vessel was continuously shaken during the heating. A considerably increase in viscosity was observed. The polymer dissolved in methylene dichloride was precipitated by stirring into dry hexane. The precipitated polymer was then dried in vacuo.

EXAMPLE 3

Polymerization of Cyclothionyl Chlorophosphazene in Solution

A solution of cyclothionyl chlorophosphazene in trichlorobenzene was heated for 8 hours to 165° C. in a closed vessel. A considerable increase in viscosity was observed. The polymer dissolved in trichlorobenzene was precipitated by pouring into dry hexane and the polymer obtained was subsequently dried in vacuo.

EXAMPLE 4

Derivatization of Polythionyl Chlorophosphazene

A solution of $NaOCH_2CF_3$ in dioxane was added to a solution of polythionyl chlorophosphazene in methylene chloride or tetrahydrofuran. The mixture was left standing for a while at room temperature in an inert gas atmosphere (nitrogen). The alkali metal salt mentioned was added to the thionyl chlorophosphazene polymer in a stoichiometric excess. Excess salt was filtered off after purification and the polymer obtained was precipitated by pouring the reaction mixture into water or hexane and was subsequently dried in vacuo. A homopolymer containing $OCH_2CF_3$ groups, which had a $T_G$ value of $-60°$ C., was obtained.

EXAMPLE 5

Derivatization of Polythionyl Chlorophosphazene

A mixture of $NaOCH_2CF_3$ and $NaOCH_2CH=CH_2$ in dioxane was added to a solution of polythionyl chlorophosphazene in methylene chloride and tetrahydrofuran, the quantitative ratio between the two alkali metal salts being 1.0:0.03. The mixture was left standing for a while at room temperature or slightly elevated temperature in an inert gas atmosphere of nitrogen. The alkali metal salt had been added in a stoichiometric excess and the excess salt was removed by extraction of the liquid phase with water/acetone. The derivatized polymer was obtained by pouring the reaction mixture into water or hexane. It was a copolymer containing the following groups:

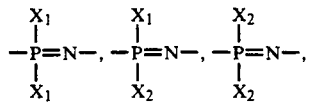

in which
$X_1$ represents $OCH_2CF_3$ and
$X_2$ represents $OCH_2CH=CH_2$.
The $T_G$ value was $-62°$ C.

EXAMPLE 6

Derivatization of a Polythionyl Chlorophosphazene

A solution of polythionyl chlorophosphazene in benzene or tetrahydrofuran was added to a solution of excess sodium phenolate in dioxane at room temperature. After 2 hours, the reaction mixture was poured into water or hexane. The precipitating polymer was colorless and had a glass transition temperature ($T_G$) of $+10°$ C.

The polymer was dissolved in a mixture of dioxane and water (95:5 parts by weight). After 7 days, no decomposition of the polymer could be detected.

What is claimed is:

1. Thionyl phosphazene polymers having an average molecular weight $M_n$ of 10,000 to 3,500,000 (g/mol) and containing recurring structural units corresponding to the following formula

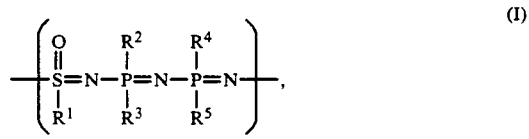

(I)

in which
$R^1$ is halogen, pseudohalogen, $C_{1-18}$ alkoxy, $C_{5-8}$ cycloalkoxy, $C_{6-14}$ aryloxy, $C_{7-18}$ alkaryloxy, $C_{2-18}$ alkenoxy, $C_{8-18}$ alkenylaryloxy or a siloxane group,
$R^2$ to $R^5$ are the same or different and represent $C_{1-18}$ alkoxy, $C_{5-8}$ cycloalkoxy, $C_{6-14}$ aryloxy, $C_{7-18}$ alkaryloxy, $C_{2-18}$ alkenoxy, $C_{8-18}$ alkenylaryloxy or siloxane,
the proportion of unsaturated substituents $R^1$ to $R^5$ being up to 10%, based on the total number of substituents $R^1$ to $R^5$.

2. A process for the production of the thionyl phosphazene polymers claimed in claim 1, wherein cyclothionyl chlorophosphazene corresponding to the following formula

(II)

is subjected to ring-opening polymerization at temperatures of 100° to 300° C. in the presence of an inert organic solvent and the polymer obtained, which corresponds to the following formula

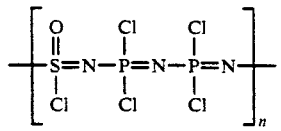

(III)

in which n is an integer of 30 to 10,600, is reacted with salts corresponding to the following formula $$M(R^1\text{-}R^5) \qquad (IV)$$

in which

M is an alkali metal or alkaline earth metal ion or a tetraalkyl ammonium ion and $R^1$ to $R^5$ represent $C_{1\text{-}18}$ alkoxy, $C_{5\text{-}8}$ cycloalkoxy, $C_{6\text{-}14}$ aryloxy, $C_{7\text{-}18}$ alkaryloxy, $C_{2\text{-}18}$ alkenoxy, $C_{8\text{-}18}$ alkenylaryloxy or a siloxane group, in the presence of an inert organic solvent at temperatures of 20° C. to 200° C.

3. Thionyl phosphazene polymers according to claim 1, wherein $R^1$ is a substituent selected from $C_{1\text{-}18}$ alkoxy, $C_{5\text{-}8}$ cycloalkoxy, $C_{6\text{-}14}$ aryloxy, $C_{7\text{-}18}$ alkaryloxy, $C_{2\text{-}18}$ alkenoxy or $C_{8\text{-}18}$ alkenylaryloxy, and further wherein said substituent has been substituted one or more times.

4. Thionyl phosphazene polymers according to claim 1, wherein $R^2$ to $R^5$ are substituents selected from $C_{1\text{-}18}$ alkoxy, $C_{5\text{-}8}$ cycloalkoxy, $C_{6\text{-}14}$ aryloxy, $C_{7\text{-}18}$ alkaryloxy, $C_{2\text{-}18}$ alkenoxy or $C_{8\text{-}18}$ alkenylaryloxy, and further wherein said substituents have been substituted one or more times.

5. A process according to claim 4, wherein $R^1$ to $R^5$ are substituents selected from $C_{1\text{-}18}$ alkoxy, $C_{5\text{-}8}$ cycloalkoxy, $C_{6\text{-}14}$ aryloxy, $C_{7\text{-}18}$ alkaryloxy, $C_{2\text{-}18}$ alkenoxy or $C_{8\text{-}18}$ alkenylaryloxy, and further wherein said substituents have been substituted one or more times.

6. Thionyl phosphazene polymers according to claim 1, wherein said siloxane group corresponds to the following formula

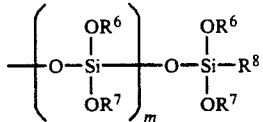

in which $R^6$ and $R^7$ are the same or different and represent $C_{1\text{-}8}$ alkyl, $C_{2\text{-}8}$ alkenyl or $C_{6\text{-}14}$ aryl groups, $R^8$ represents $OC_{1\text{-}8}$ alkyl, $OC_{6\text{-}14}$ aryl, an amino group or an O-acryl group, and m is 0 or an integer from 1 to 10.

7. A process according to claim 2, wherein said siloxane group corresponds to the following formula

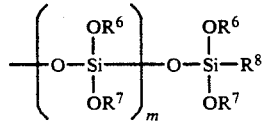

in which $R^6$ and $R^7$ are the same or different and represent $C_{1\text{-}8}$ alkyl, $C_{2\text{-}8}$ alkenyl or $C_{6\text{-}14}$ aryl groups, $R^8$ represents $OC_{1\text{-}8}$ alkyl, $OC_{6\text{-}14}$ aryl, an amino group or an O-acryl group, and m is 0 or an integer from 1 to 10.

8. Thionyl phosphazene polymers according to claim 6, wherein $R^6$ and $R^7$ are methyl or phenyl, $R^8$ is O-methyl or O-phenyl, and m is 1 to 10.

9. A process according to claim 7, wherein $R^6$ and $R^7$ are methyl or phenyl, $R^8$ is O-methyl or O-phenyl, and m is 1 to 10.

10. A method of using the thionyl phosphazene polymers claimed in claim 1, wherein the thionyl phosphazene polymers are subjected to crosslinking to form thermoplastics, elastomers or thermosets.

* * * * *

UNITED STATES PATENT AND TRADEMARK OFFICE
CERTIFICATE OF CORRECTION

PATENT NO. : 5,241,017
DATED : 8-31-93
INVENTOR(S) : Manners, et al

It is certified that error appears in the above-indentified patent and that said Letters Patent is hereby corrected as shown below:

Column 9, claim 5, line 37, "claim 4" should be corrected to read --claim 2--.

Signed and Sealed this

Twenty-second Day of March, 1994

Attest:

BRUCE LEHMAN

*Attesting Officer*     *Commissioner of Patents and Trademarks*